United States Patent [19]

Koiwai et al.

[11] Patent Number: 5,495,307
[45] Date of Patent: Feb. 27, 1996

[54] CAMERA

[75] Inventors: Tamotsu Koiwai, Akikawa; Yukihiko Sugita, Kokubunji; Hiroshi Takase, Hachioji, all of Japan

[73] Assignee: Olympus Optical Co., Ltd., Tokyo, Japan

[21] Appl. No.: 362,127

[22] Filed: Dec. 22, 1994

[30] Foreign Application Priority Data

Dec. 30, 1993 [JP] Japan ................................ 5-351086

[51] Int. Cl.⁶ .................................................. G03B 17/02
[52] U.S. Cl. ........................ 354/159; 354/152; 354/155; 354/225
[58] Field of Search ................................ 354/159, 224, 354/225, 152, 155

[56] References Cited

U.S. PATENT DOCUMENTS 3,956,759  5/1976  Karikawa .
4,114,171  9/1978  Altman .
5,253,005  10/1993  Koyama et al. .

Primary Examiner—Monroe H. Hayes
Attorney, Agent, or Firm—Louis Weinstein

[57] ABSTRACT

A camera comprises: a photographing lens; a viewfinder lens lying behind the photographing lens so that an object to be photographed can be viewed; a first reflector mirror capable of being displaced between a first position, at which the first reflector mirror intervenes between the photographing lens and viewfinder lens so that light emanating from the photographing lens is reflected horizontally substantially at 90°, and a second position at which the first reflector mirror has retracted from between the photographing lens and viewfinder lens; a second reflector mirror lying by the side of the first reflector mirror so that the light emanated from the photographing lens and reflected from the first reflector mirror is reflected vertically substantially at 90°; an image forming plane lying below the second reflector mirror so that the light emanated from the photographing lens and reflected from the second reflector mirror forms an image thereon; and an aperture for determining a picture size that defines a zone to be exposed of film lying on the image forming plane.

4 Claims, 6 Drawing Sheets

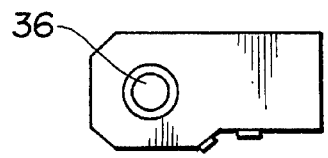
FIG.1C
FIG.1F  FIG.1E  FIG.1A  FIG.1D
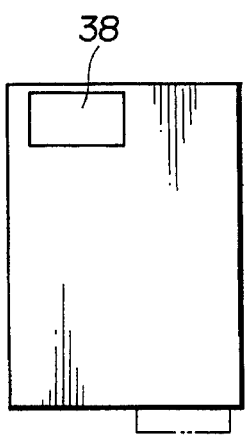
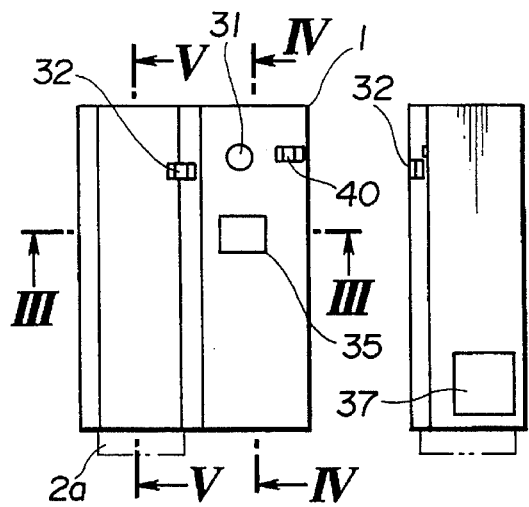
FIG.1B
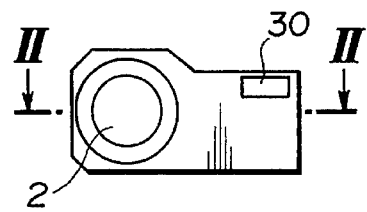

CAMERA

BACKGROUND OF THE INVENTION

1. Field of the Invention

The present invention relates to a camera, and more particularly, to a camera having a mechanism that includes mirrors for angling an optical axis.

2. Description of the Related Art

Conventionally, in a standard single-lens reflex type camera, a retractable mirror is placed behind a photographing lens and film is transported behind the mirror. A light beam angled upward by the mirror is routed to the back of the camera means of a pentagonal roof prism. The light beam then reaches a photographer's eye through an eyepiece lens.

For a standard leaf-shutter type compact camera, various novelties have been conceived in an effort to materialize a more compact camera body, improve ease-of-holding, and prevent a finger from obstructing light projecting and receiving lenses for use in automatic focusing, a viewfinder window, or a window for a strobe flashing unit.

In the foregoing conventional single-lens reflex type camera, when a Patrone that is smaller than a Patrone containing film conformable to Japanese Industrial Standard JIS-135 is employed, a picture size becomes smaller than that permitted by the employment of a conventional Patrone. The whole of the camera can therefore be designed more compactly.

However, in the foregoing conventional single-lens reflex type camera, when a small-sized Patrone is employed, if the whole of a camera body is designed compactly without any consideration, the overall width of the camera body becomes smaller. Accordingly, a grip cannot help lying very closely to a photographing lens and a viewfinder. Consequently, the camera cannot be held firmly.

In the foregoing conventional leaf-shutter type compact camera, as mentioned above, various components have been added in order to prevent a finger from obstructing the light projecting and receiving lenses for use in automatic focusing, viewfinder window, or window for a strobe flashing unit, and various proposals have been made for the layout of these components. However, when an attempt is made to design a compact camera body by employing a small-sized Patrone, as long as conventional components are to be incorporated in the camera body, a camera having a satisfactory form cannot be materialized.

OBJECTS AND SUMMARY OF THE INVENTION

A first object of the present invention is to provide a camera having components that can be laid out to realize an easy-to-hold form despite the inclusion of a small-sized Patrone.

A second object of the present invention is to provide a compact camera no part of which is uneven and which can be stored in a limited place.

A third object of the present invention is to provide a single-lens reflex type camera preventing the occurrence of parallax.

A fourth object of the present invention is to provide a compact camera permitting TTL automatic focusing and switching of picture size frame indicators.

Briefly, a camera in accordance with the present invention comprises:

a photographing lens;

a viewfinder lens located behind the photographing lens so that an object to be photographed can be viewed;

a first reflector mirror capable of being displaced between a first state, in which the first reflector mirror has projected to a position between the photographing lens and viewfinder lens so the light emanating from the photographing lens is reflected horizontally substantially at 90°, and a second state in which the first reflector mirror has retracted from the position between the photographing lens and viewfinder lens;

a second reflector mirror located at the side of the first reflector mirror so that the light emanated from the photographing lens and reflected from the first reflector mirror is reflected vertically substantially at 90°;

an image forming plane located below the second reflector mirror so that the light emanated from the photographing lens and reflected from the second reflector mirror forms an image thereon; and an aperture for determining a picture size that defines an exposed zone of film positioned on the image forming plane.

The above as well as other objects and advantages of the present invention will be further apparent from the detailed description below.

BRIEF DESCRIPTION OF THE DRAWINGS

FIG. 1A is a top view showing an appearance of a camera in accordance with the first embodiment of the present invention;

FIG. 1B is a front view showing an appearance of the camera of the first embodiment;

FIG. 1C is a back view showing an appearance of the camera of the first embodiment;

FIG. 1D is a right side view showing an appearance of the camera of the first embodiment;

FIG. 1E is a left side view showing an appearance of the camera of the first embodiment;

FIG. 1F is a bottom view showing an appearance of the camera of the first embodiment;

DETAILED DESCRIPTION OF THE PREFERRED EMBODIMENTS

Figure 2:
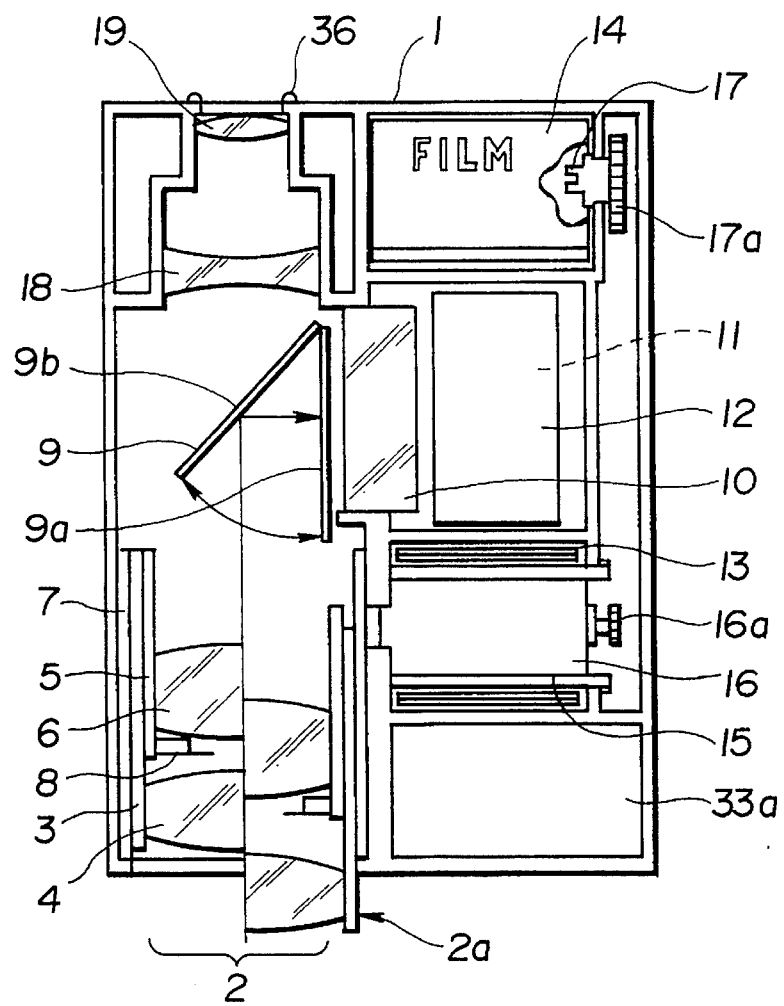
FIG. 2 is a sectional view showing major components existent on a II—II plane in FIG. 1B.

Referring to the drawings, embodiments of the present invention will be described below.

FIGS. 1A to 1F show an appearance of a camera in accordance with the first embodiment of the present invention. FIG. 1A is a top view. FIG. 1B is a front view. FIG. 1C is a back view. FIG. 1D is a right side view. FIG. 1E is a left side view. FIG. 1F is a bottom view.

As shown in FIGS. 1A to 1F, a photographing lens 2 and a flashing unit 30 are mounted on the front surface of a camera body 1. A release button 31, a zoom switch 32 slidable laterally in order to drive a zoom motor, and a display 35, which is an LCD, for displaying exposure-related information and the number of exposed frames are mounted at specific positions on the top of the camera body 1.

A viewfinder eyepiece unit 36 is mounted on the back surface of the camera body 1. A battery cover 37 that can be removed in order to load or unload a battery 33 (See FIG. 4) serving as a power supply is mounted on the right side surface of the camera body 1. A Patrone cover 38 that can be removed in order to load or unload a Patrone 14 (See FIG. 2) is mounted on the bottom of the camera body 1. A power switch 40 (See FIG. 8) for use in turning on or off the power supply is formed on the top of the camera body 1.

Figure 3:
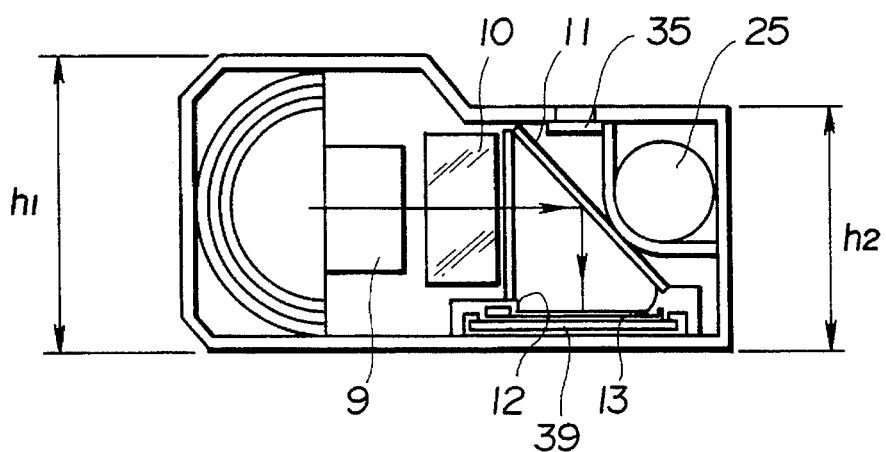
FIG. 3 is a sectional view showing major components existent on a III—III plane in FIG. 1A.

FIG. 2 is a sectional view showing major components existent on a II—II plane in FIG. 1B. FIG. 3 is a sectional view showing major components existent on a III—III plane in FIG. 1A.

As shown in FIG. 2, the photographing lens 2 comprises a movable frame 3 that is movable back and forth (vertically in FIG. 2) along an axis of incident light, a group of lenses 4 immobilized by the movable frame 3, a movable frame 5, and a group of lenses 6 immobilized by the movable frame 5. These elements of the photographing lens 2 move with the turn of a cam frame 7 containing a moving cam mechanism that is not shown. Reference numeral 2a denotes the photographing lens 2 in a zoom state for which the photographing lens is moved forward along the optical axis by sliding the zoom switch. In this embodiment, the photographing lens comprises two groups of lenses. The number of groups of lenses is not limited to two but may be determined arbitrarily.

A diaphragm/shutter unit 8 having capabilities of a shutter and a diaphragm is fixed to the movable frame 5. A first mirror 9 is placed behind the photographing lens 2 (upper part of FIG. 2) in order to angle a light beam passing through the photographing lens 2 by 90° horizontally rightward.

The first mirror 9 is pivotable between a refractive position 9a and a photographic position 9b. In FIG. 2, an auxiliary lens 10 is located on the right hand of the first mirror 9. The auxiliary lens 10 extends a back-focal distance of the photographic lens 2 so that an image is formed on the surface of film 13. A second mirror 11 which is shown in detail in FIG. 3 is placed on the right hand of the auxiliary lens 10. The second mirror 11 is positioned so that a light beam is angled by 90° vertically downward in FIG. 3. The light beam angled downward by the second mirror 11 exposes a zone of the film 13 defined by the aperture 12.

As shown in FIG. 2, the Patrone 14 lies behind the aperture 12 (upper part of FIG. 2). A coupling (not shown) in the Patrone is coupled with a drive fork 17, whereby film is fed. The drive fork 17 has a gear 17a that is coupled with a motor 16 via a film feed gear array which is not shown.

A film take-up spool 15 is rotatable owing to a built-in motor 16. The spool 15 is driven and rotated by means of a gear array engaging with a pinion gear 16a of the motor 16. The motor 16 is locked in the camera body 1. The film 13 is fed from the Patrone 14 and wound about the spool 15. At this time, the film 13 is retained at a given position on the optical axis between a film presser 39 (see FIG. 3) and the aperture 12.

Figure 4:
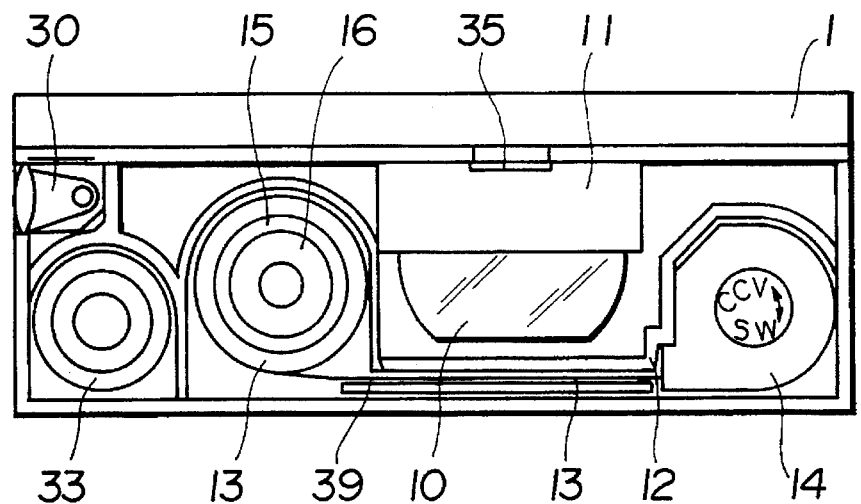
FIG. 4 is a sectional view showing major components existent on a IV—IV plane in FIG. 1A.

As shown in FIG. 3, the display 35 and a main capacitor 25 for flashing are located in a space defined between the second mirror 11 and camera body 1. As shown in FIG. 2, a battery chamber 33a dedicated to the supply battery 33 is formed ahead of the spool FIG. 4 is a sectional view showing major components existent on a IV—IV plane in FIG. 1A. FIG. 4 shows a center part of the plane alone, wherein the lower half of the second mirror 1 is invisible but the lower half of the auxiliary lens 10 is visible.

As illustrated, the film 13 is ejected through an outlet of the Patrone 14, transported below the aperture 12, and wound about the spool 15. The supply battery 33 and flashing unit 30 are located ahead of the spool 15.

Next, the viewfinder optical system in the camera of this embodiment will be described with reference to FIG. 5.

Figure 5:
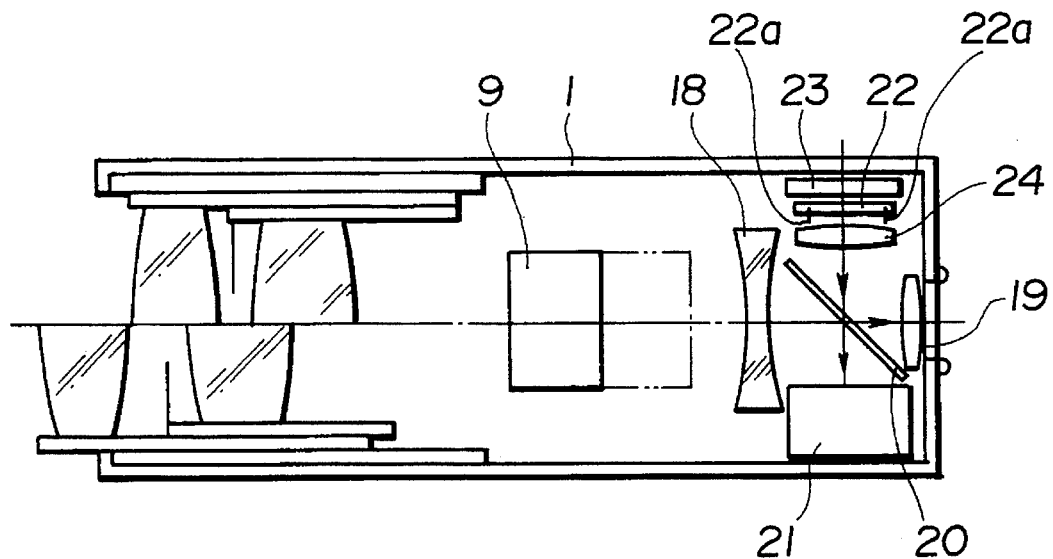
FIG. 5 is a sectional view showing major components existent on a V—V plane in FIG. 1A.

FIG. 5 is a sectional view showing major components existent on a V—V plane in FIG. 1A. FIG. 5 shows the left half of the first mirror 9 alone.

As illustrated, when the first mirror 9 lies at the retractive position 9a (See FIG. 2), a light beam passing through the photographing lens 2 is not angled by the first mirror 9 but is routed straight to the viewfinder optical system lying behind the first mirror 9. When the first mirror 9 lies at the retractive position 9a, the light beam passing through the photographing lens 2 is not routed to film but is intercepted completely.

The viewfinder optical system is composed of a negative lens 18 and a positive lens 19. A third mirror 20 that is thin and translucent is placed behind the negative lens 18. The third mirror 20 angles downward part of the light beam so that the part of the light beam enters an automatic focusing unit made up of a range finding sensor for automatic focusing and an optical system.

A backlight 23 serving as a light source is placed above the third mirror 20. The backlight 23 projects the LCD 22 for indicating a picture size frame as well as a picture size frame indicator 22a on the LCD 22 via a projection lens 24. The backlight 23 is realized with an LED or a surface light-emitting element. The picture size frame indicator 22a on the LCD 22 is variable; that is, is changed among picture size frame indicators defining formats of a normal size (aspect ratio of 1 vs. 1.5) that is a standard print size, a panorama size (about 1 vs. 2.8), a high-definition vision size (about 1 vs. 1.8) and a Cinemascope size (about 1 vs. 2.3).

The high-definition vision size corresponds to the aspect ratio of a screen of a high-definition TV which has been proclaimed by Nippon Hoso Kyokai (NHK). The aspect ratio is the same as that of a screen of a wide-screen TV. The Cinemascope size corresponds to the aspect ratio for Cinemascope proclaimed by Twentieth Century Fox Inc.

In the camera of this embodiment, because of the compactness, the aperture 12 is designed to cope with the format of the high-definition vision size of about 16 by 28 mm instead of that of the standard picture size of 24 by 36 mm adopted for rolled film conformable to Japanese Industrial Standard JIS-135. Accordingly, the photographing lens 2 is designed to be smaller by a ratio between diagonal lines of rectangles defined with the sizes than a conventional one.

Light rendering the picture size frame indicator 22a on the LCD 22 and emanating from the backlight 23 is transmitted by the projection lens 24 and angled backward by the third mirror 20, and seen being superposed on a subject image by a photographer looking through the viewfinder. The remainder of the light emanating from the backlight 23 is transmitted by the third mirror 20. Part of the remainder then enters the automatic focusing optical system. For range finding, a means for preventing occurrence of an error is included so that fixed light is removed.

Figure 6:
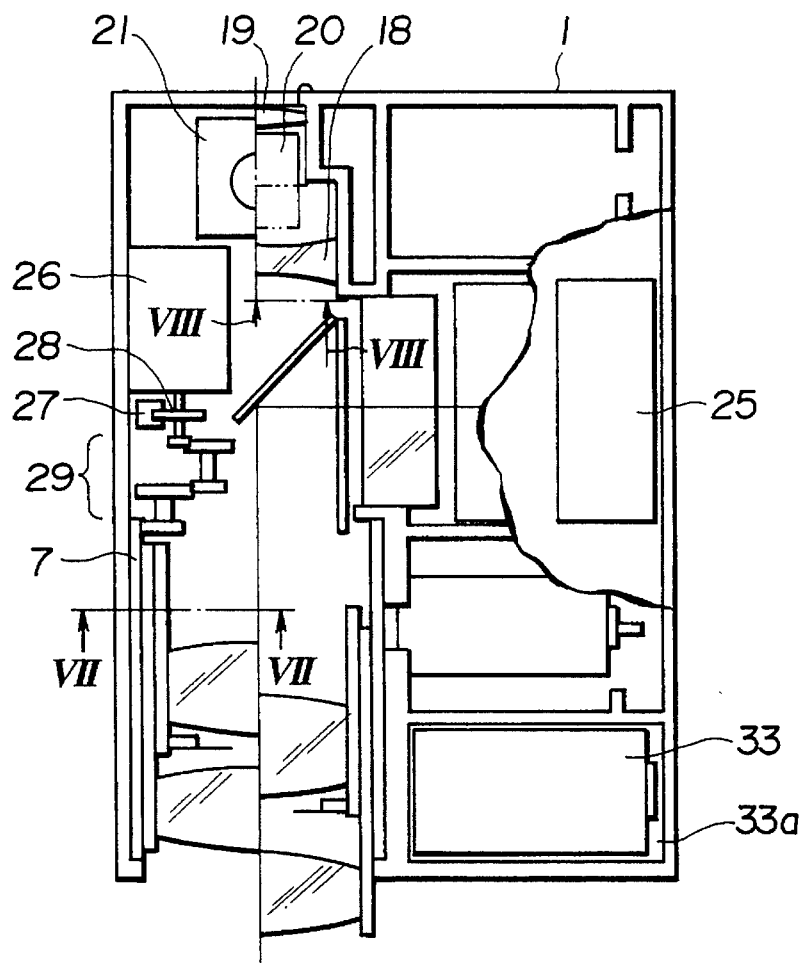
FIG. 6 is a sectional view showing a zoom drive unit 10 and an automatic focusing unit in the first embodiment.
Figure 7:
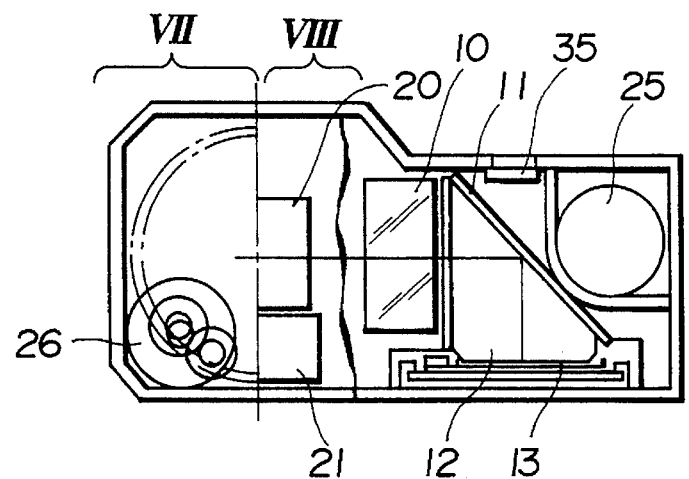
FIG. 7 is a partially sectional view showing a VII—VII plane and a VIII—VIII plane in FIG. 6 as well as a plane containing an optical axis.

FIG. 6 is a sectional view showing a zoom drive unit and an automatic focusing unit in this embodiment. FIG. 7 is a partially sectional view showing VII—VII and VIII—VIII planes in FIG. 6 as well as a plane containing an optical axis.

As illustrated, a porous disk 28 for use in combination with a photo-interrupter that monitors a quantity of drive is fixed coaxially to the output axis of a zoom motor 26. A photo-interrupter 27 for detecting the number of turns encloses part of the disk 28. The driving force of the zoom motor 26 is reduced by a gear array 29. Thus, torque is conveyed to the cam frame 7.

When the cam frame 7 turns, the photographing lens 2 moves for zooming. Whether the photographing lens 2 enters the zoom state (moves a specific focal distance) is detected by the photo-interrupter 27 as well as a member (not shown) for detecting whether an end of the photographing lens 2 lies at a specific position for zooming. Based on the result of detection, an automatic focusing drive mechanism that is not shown controls the movements of groups of lens to be made for focusing. The automatic focusing unit 21 is hidden below the third mirror 20 that is a half mirror. As shown in FIG. 6, the battery chamber 33a accommodates the supply battery 33. The main capacitor 25 for flashing lies in the upper right-hand part of the camera body 1.

Next, the operation of this embodiment will be described. To begin with, the viewfinder optical system for routing a light beam to photographer's eye via the photographing lens 2 will be described.

Figure 8:
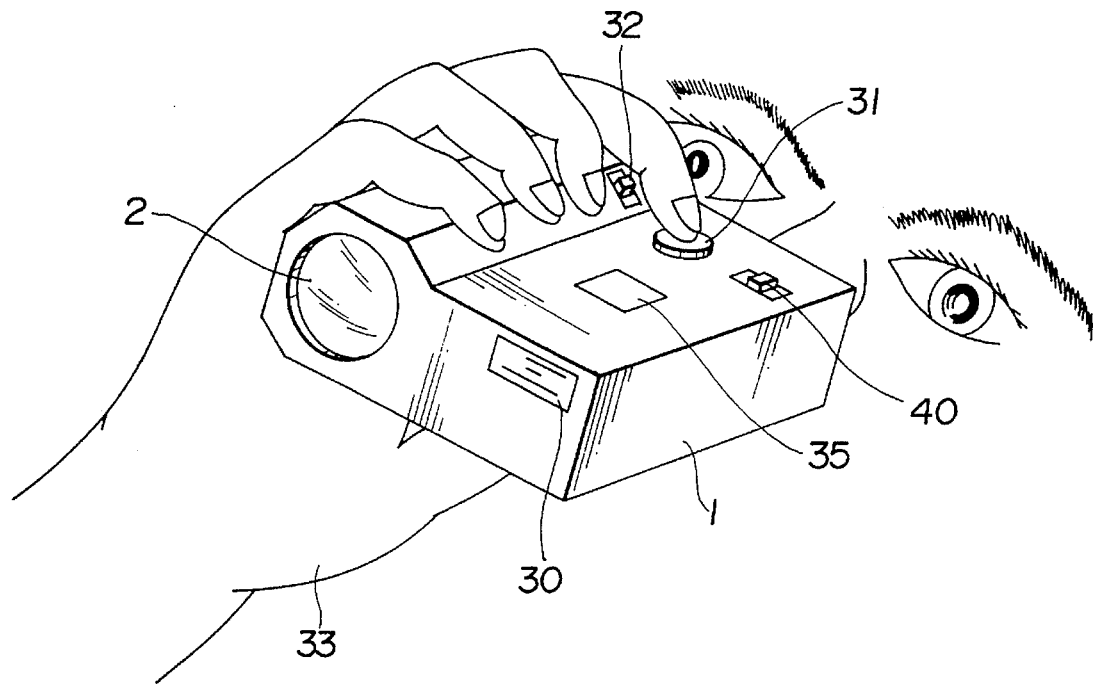
FIG. 8 is an oblique view showing a photographer's style of holding a camera in accordance with the first embodiment for performing photography.

FIG. 8 is an oblique view showing a photographer's style of holding a camera in accordance with this embodiment and performing photography.

When the power switch 40 is off, as shown in FIG. 2, the photographing lens 2 is aligned with the front of the camera or set at a retractive position. When the power switch 40 is turned on the photographing lens 2 can be moved for zooming by means of tile zoom switch 32. Herein, when the power switch 40 is off, if the photographing lens 2 is collapsed, the photographing lens 2 moves a given focal distance automatically with the power switch 40 turned on.

The first mirror 9 stays at the retractive position 9a (See FIG. 2). A light beam destined for film is intercepted. The film will therefore not be exposed to light. The diaphragm/shutter unit 8 remains open. The incident light beam is therefore routed to the viewfinder optical system. Owing to the viewfinder optical system made up of the negative and positive lenses 18 and 19, a photographer looking through the viewfinder eyepiece unit 36 lying behind the photographing lens can view the subject imaged by the photographing lens 2.

Part of the light beam enters the automatic focusing unit 21 by means of the third mirror 20 that is a half mirror. When the photographer presses the release button 31 to the first stroke position, range finding is carried out. Thereafter, focusing is effected. Various kinds of information concerning the camera is displayed on the display 35 that is an LCD.

The photographer sees the picture size frame indicator 22a on the LCD 22, which is visualized through the projection lens 24 by means of the backlight 22, being superposed on the subject image which is produced by the photographing lens 2. The photographer can now perform framing.

Next, an image form/fig mechanism in which a light beam travels from the photographing lens 2 to the film 13 will be described.

First, a photographer presses the release button 31 to the first stroke position. This triggers automatic focusing. When the automatic focusing is completed, if the release button 32 is further pressed to the second stroke position, an exposure sequence starts. Thereafter, the shutter member included in the diaphragm/shutter unit 8 closes completely, and then the diaphragm opens to provide a given aperture size.

Next, the first mirror 9 turns about 45° clockwise so as to pivot from the retractive position 9a to the photographic position 9b, and thus lies on the optical axis of the photographing lens 2. The shutter member in the diaphragm/shutter unit 8 remains open for a given period of time. The light beam passing through the photographing lens 2 is angled rightward by the first mirror 9. Since the image forming position is extended due to the presence of the auxiliary lens 10 (See FIG. 2), after the light beam is angled downward by the second mirror 11, an image is formed in a zone on the surface of the film 13 defined by the aperture 12 (See FIG. 3).

When the shutter is closed, the first mirror 9 turns counterclockwise so as to return from the photographic position 9b to the retractive position 9a (See FIG. 2). After the diaphragm is further opened, the shutter opens.

While the surface of film is being exposed, the light beam reflected from the first mirror 9 toward the viewfinder optical system is intercepted completely. No light enters inversely through the viewfinder optical system.

For loading the film 13, the Patrone cover 38 is removed from the bottom of the camera body 1. The Patrone 14 containing the film 13 has a smaller external diameter (17 mm) and height (about 30 mm) than a conventional Patrone containing rolled film conformable to Japanese Industrial Standard JIS-135. The overall length of the film 13 is wound up in the Patrone 14, meaning that no leader is coming out of the Patrone 14.

The Patrone 14 has a small height. The width of the camera body 1 that is a lateral diameter of the top view in FIG. 1 is as small as about 70 mm.

When the Patrone cover 38 is attached, the drive fork 17 is rotated clockwise in FIG. 4 via the gear 17a by means of the gear array, which is not shown, driven by the motor 16. Thereafter, the film 13 is ejected from the Patrone 14 through the outlet and fed to the spool 15. The spool 15 is then driven clockwise in FIG. 4 by the motor 16. Owing to a mechanism that is not shown, the rotational motion of the Patrone 14 will not interfere with the movement of the driven spool 15.

When photography is completed, the Patrone 14 is driven and the film 13 is rewound into the patrone 14. The rotational motion of the Spool 15 will not interfere with the rewinding of film.

After photography is completed, when the power switch 40 is turned off, the photographing lens 2 retracts to a position at which the photographing lens 2 does not protrude from the camera body 1 and then stands still.

The supply battery 33 is, as mentioned above, stowed ahead of the spool 15 (sea FIGS. 2 and 4). The battery cover 37 through which a artery is loaded or unloaded is mounted on the right side surface of the camera body 1 along which the battery chamber 33a is formed (See FIG. 1D). Since the photographing lens 2 is longer than the take-up spool 15 in the longitudinal direction of the camera, the supply battery 33 is positioned in a space ahead of the spool 15 so that the space can be utilized effectively. Likewise, the flashing unit 30 is placed in a space ahead of the spool 15 so that the flashing unit 30 is separated from the photographing lens 2 when viewed from ahead of the camera. Thus, the requirements against a red-eye phenomenon are satisfied fully (See FIGS. 1B and 4).

The main capacitor 25 for flashing is, as mentioned above, interposed between the second mirror 11 and camera body 1 (See FIGS. 3 and 7). That is to say, as shown in FIG. 7, the main capacitor 25 is efficiently allocated to a space whose cross section is shaped substantially like a triangle. The main capacitor 25 and supply battery 33 resemble each other in terms of shape. The locations of the main capacitor 25 and supply battery 33 can therefore be exchanged mutually.

For sufficient brightness, the photographing lens 2 must have a somewhat large diameter. In this embodiment, the photographing lens 2 is designed to permit a focal distance ranging from 26 to 100 mm (comparable to a focal distance ranging from 35 to 135 mm for a full-size 35-mm camera) and a diameter of a filter measuring about 35 mm. Thus, as shown in FIG. 3, the portion of the camera body 1 containing the photographing lens 2 has a larger height h1. However, when the aforesaid components are laid out as mentioned above, the right-hand portion of the camera consisting of the Patrone 14, spool 15, supply battery 33, main capacitor 25, and flashing unit 30 has a height h2 that is smaller than the height h1. A difference between the heights h1 and h2 is, for example, about 8 mm.

As long as a holding style such as the one shown in FIG. 8 is concerned, a photographer can hold the convex portion of the camera body containing the photographing lens 2. Thus, firm holding causing no hand tremor is realized.

The display 35 is allocated to a space defined above the second mirror 11. This enables a photographer to hold the camera body 1 without obstructing the display 35 with his/her finger.

In this embodiment, the first mirror 9 pivots between the retractive position and the photographic position. Alternatively, the first mirror 9 may be realized with a translucent half mirror. This variant has the same advantage as the embodiment.

According to the first embodiment, first and second mirrors are incorporated so that a light beam passing through the photographing lens 2 is routed horizontally to film running longitudinally in the camera body. A compact camera no part of which is protruding and which can be stored in a limited place can therefore be materialized. A viewfinder optical system is placed behind the first mirror so that the light beam passing through the photographing lens is used as it is. This results in a single-lens reflex type camera causing no parallax.

The aforesaid layout of components realizes a compact camera permitting TTL automatic focusing and switching of picture size frame indicators.

Next, the second embodiment of the present invention will be described.

Figure 9:
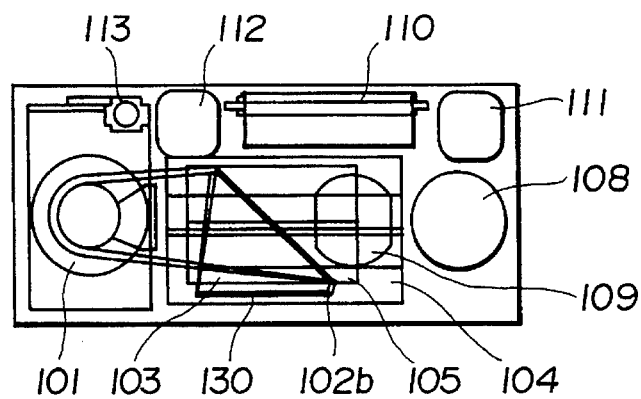
FIG. 9 is a perspective front view showing a camera in accordance with the second embodiment of the present invention.
Figure 10:
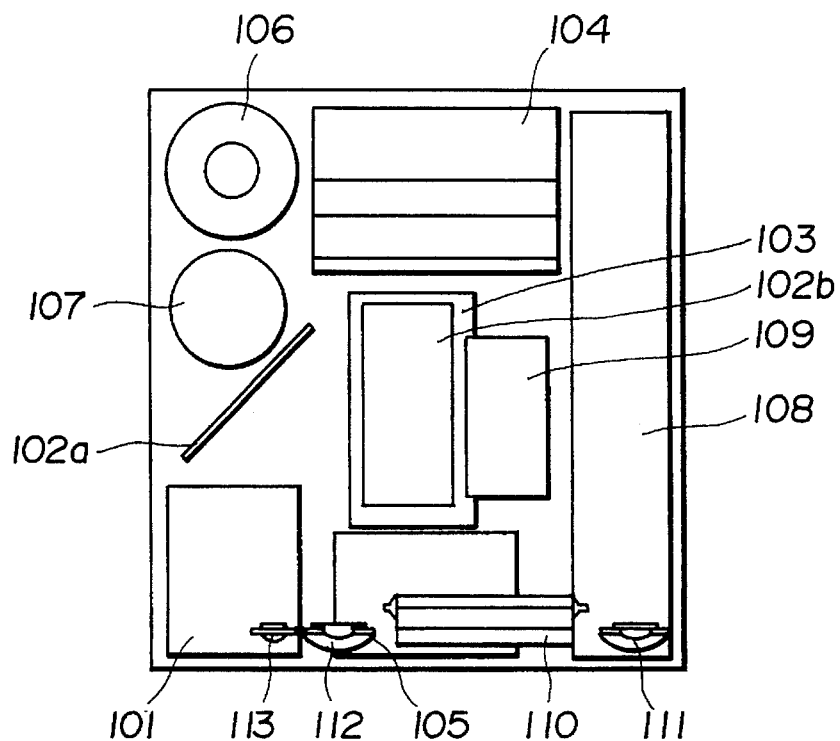
FIG. 10 is a perspective top view showing the camera of the second embodiment of the present invention.
Figure 11:
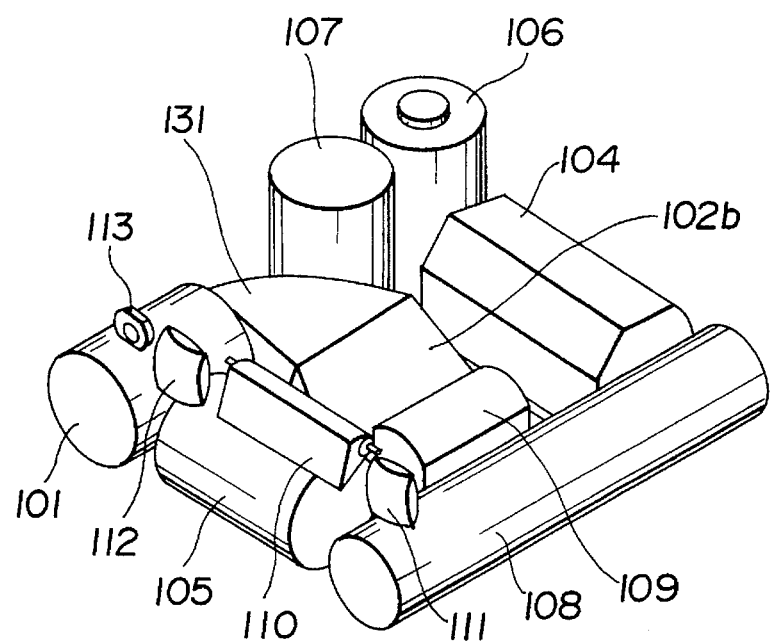
FIG. 11 is an oblique view showing major components of the camera of the second embodiment.

FIG. 9 is a front view showing a camera in accordance with the second embodiment of the present invention. FIG. 10 is a top view showing the camera in accordance with the second embodiment. FIG. 11 is an oblique perspective view showing major components of the camera in accordance with the second embodiment.

In the illustrated camera of the second embodiment, a photographing lens barrel 101 is located in one lateral front part of a camera body. A first mirror 102a for reflecting photographic light passing through the photographing lens barrel 101 toward the other lateral part of the camera body (right-hand part in FIG. 10) is placed behind the photographing lens barrel 101. A second mirror 102b for reflecting downward the light beam reflected from the mirror 102a is located in the other lateral part of the camera body beyond the first mirror 102a (See FIG. 9). An aperture 103 is formed below the second mirror 102b. Film 130 runs below the aperture 103.

Located behind the aperture 103 is a Patrone chamber in which a small-sized Patrone 104 that is of the same type as the Patrone 14 mentioned in conjunction with the first embodiment is loaded. Located ahead of the aperture 103 is a film take-up chamber (spool chamber) 105 for winding in the film 130 fed from the small-sized Patrone 104. A built-in battery 106 is placed on one side of the Patrone chamber. A main capacitor 107 for strobe flashing is placed ahead of the built-in battery 106.

A viewfinder 108 serving as a relay optical system is placed in the other lateral part of the camera body beyond the aperture 103. A moron 109 for use in winding or rewinding film and driving lenses is interposed between the viewfinder 108 serving as a relay optical system and the aperture 103.

A strobe 110 is placed above the film take-up chamber 105. A light projecting lens 111 and a light receiving lens 112 which are designed for range finding for automatic focusing are placed with the strobe 110 between them. A range finding lens 113 lies in tile vicinity of the light receiving lens 112.

In FIG. 11, reference numeral 131 denotes a light path for a light beam reflected from the first mirror 102a.

In the foregoing camera of the second embodiment, a light beam passing through the photographing lens barrel 101 is first reflected about 90° toward the other lateral part of the camera body by means of the first mirror 102a (See FIG. 10). The light beam is then reflected about 90° downward by means of the second mirror 102b. The light beam then forms an image on the surface of the film 130 after passing through the aperture 103.

According to the camera of the second embodiment, the direction in which film runs is in parallel with the orientation of a photographing lens. The employment of a viewfinder serving as an external-light relay optical system leads to a reduction in overall length of a camera body. Furthermore, spaces are utilized effectively by placing a main capacitor and a battery in tandem behind a first mirror. Moreover, a photographer can hold the camera body without obstructing a strobe flashing unit or a light receiving lens designed for range finding for automatic focusing.

As described so far, according to the present invention, there is provided a camera having components that can be laid out to realize an easy-to-hold shape despite the inclusion of a small-sized Patrone.

In the present invention, it is apparent that a wide range of different working modes can be formed on the basis of the invention of without departing from the spirit and scope of the invention. This invention is not restricted to any specific embodiments but is limited only by the appended claims.

What is claimed is:

1. A camera, comprising:

a photographing lens;

a viewfinder lens lying behind said photographing lens so that an object to be photographed can be viewed;

a first reflector mirror capable of being displaced between a first position, at Which said first reflector mirror intervenes between said photographing lens and viewfinder lens so that light emanating from said photographing lens is reflected horizontally substantially at 90° and a second position at which said first reflector mirror is retracted from between said photographing lens and viewfinder lens;

a second reflector mirror lying by a side of said first reflector mirror so that said light emanated from said photographing lens and reflected from said first reflector mirror is reflected vertically substantially at 90°;

an image forming plane lying below said second reflector mirror so that said light emanated from said photographing lens and reflected from said second reflector mirror forms an image thereon; and an aperture for determining a picture size that defines a zone to be exposed of film lying on said image forming plane.

2. A camera according to claim 1, wherein said film is fed substantially in parallel with an optical axis of said photographing lens.

3. A camera, comprising:

a photographic optical system;

a photographing lens included in said photographic optical system and located on a side of an object to be photographed;

a first reflector mirror being one element of said photographic optical system and lying behind said photographing lens so that a light beam passing through said photographing lens is reflect ed horizontally substantially at 90°;

a second reflector mirror being another element of said photographic optical system and lying by a side of said first reflector mirror so that said light passed through said photographing lens and reflected from said first reflector mirror is reflected vertically substantially at 90°;

an image forming plane lying below said second reflector mirror so that said light passed through said photographing lens and reflected from said second reflector mirror forms an image thereon;

an aperture for determining a picture size that defines a zone to be exposed on a film positioned at said image forming plane;

a driving means for displacing said first reflector mirror to a given position so that said light beam passing through said photographing lens is transmitted in rearward direction but is not reflected; and a viewfinder optical system lying behind said first reflector mirror so that only when said first reflector mirror is displaced to said given position, said object to be photographed can be viewed.

4. A camera, comprising:

a photographing lens;

a viewfinder lens lying behind said photographing lens so that an object to be photographed can be viewed;

a first reflector mirror capable of being displaced between a first position, at which said first reflector mirror intervenes between said photographing lens and viewfinder lens so that light emanating from said photographing lens is reflected horizontally substantially at 90°, and a second position at which said first reflector mirror has retracted from between said photographing lens and said viewfinder lens;

a second reflector mirror lying by a side of said first reflector mirror so that said light emanated from said photographing lens and reflected from said first reflector mirror is reflected vertically substantially at 90°;

an image forming plane lying below said second reflector mirror so that said light emanated from said photographing lens and reflected from said second reflector mirror forms an image thereon;

an aperture for determining a picture size that defines a zone to be exposed on a film positioned at said image forming plane;

a cartridge chamber lying by a side of said viewfinder lens behind said aperture to accommodate a film cartridge from which film is fed toward said image forming plane; and a film take-up means lying by a side of said photographing lens ahead of said aperture to wind in said film fed out of said film cartridge and passing being said aperture.

* * * * *